(12) United States Patent
Coleman et al.

(10) Patent No.: US 6,463,198 B1
(45) Date of Patent: Oct. 8, 2002

(54) MICRO COMPOSITE FIBER OPTIC/ELECTRICAL CABLES

(75) Inventors: J. Douglas Coleman, Hickory; Herbert V. Congdon, II, Conover, both of NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/538,706

(22) Filed: Mar. 30, 2000

(51) Int. Cl.[7] .................................................. G02B 6/44
(52) U.S. Cl. .......................... 385/101; 385/102; 385/107
(58) Field of Search .................................... 385/100–114

(56) References Cited

U.S. PATENT DOCUMENTS

| | | | |
|---|---|---|---|
| 4,095,101 A | 6/1978 | Lemelson | 250/227 |
| 4,820,012 A | 4/1989 | Asai | 350/96.23 |
| 4,895,426 A | 1/1990 | Pinson | 350/96.23 |
| 4,896,939 A | 1/1990 | O'Brien | 350/96.23 |
| 4,971,420 A * | 11/1990 | Smith | |
| 4,979,795 A * | 12/1990 | Mascarenhas | |
| 5,202,944 A * | 4/1993 | Riordan | |
| 5,467,420 A | 11/1995 | Rohrmann et al. | 385/101 |

* cited by examiner

Primary Examiner—Hung N. Ngo
(74) Attorney, Agent, or Firm—Timothy J. Aberle

(57) ABSTRACT

Composite cables operative to transmit information in optical transmission and/or electrical power modes. The composite cables include an optical fiber operative to transmit light comprising a silica-based core with a silica-based cladding having a lower index of refraction than the core, the core and cladding are surrounded by two layers of plastic that define a soft primary coating surrounding and in contact with the cladding, and a relatively rigid secondary coating that surrounds and is in contact with the primary coating. The optical fiber has an outside diameter of about 250 μm to about 500 μm or more, and an electrical conductor surrounds the secondary coating. The composite cable includes an outermost cable jacket layer having an outside diameter of about 3,500 μm or less.

12 Claims, 1 Drawing Sheet

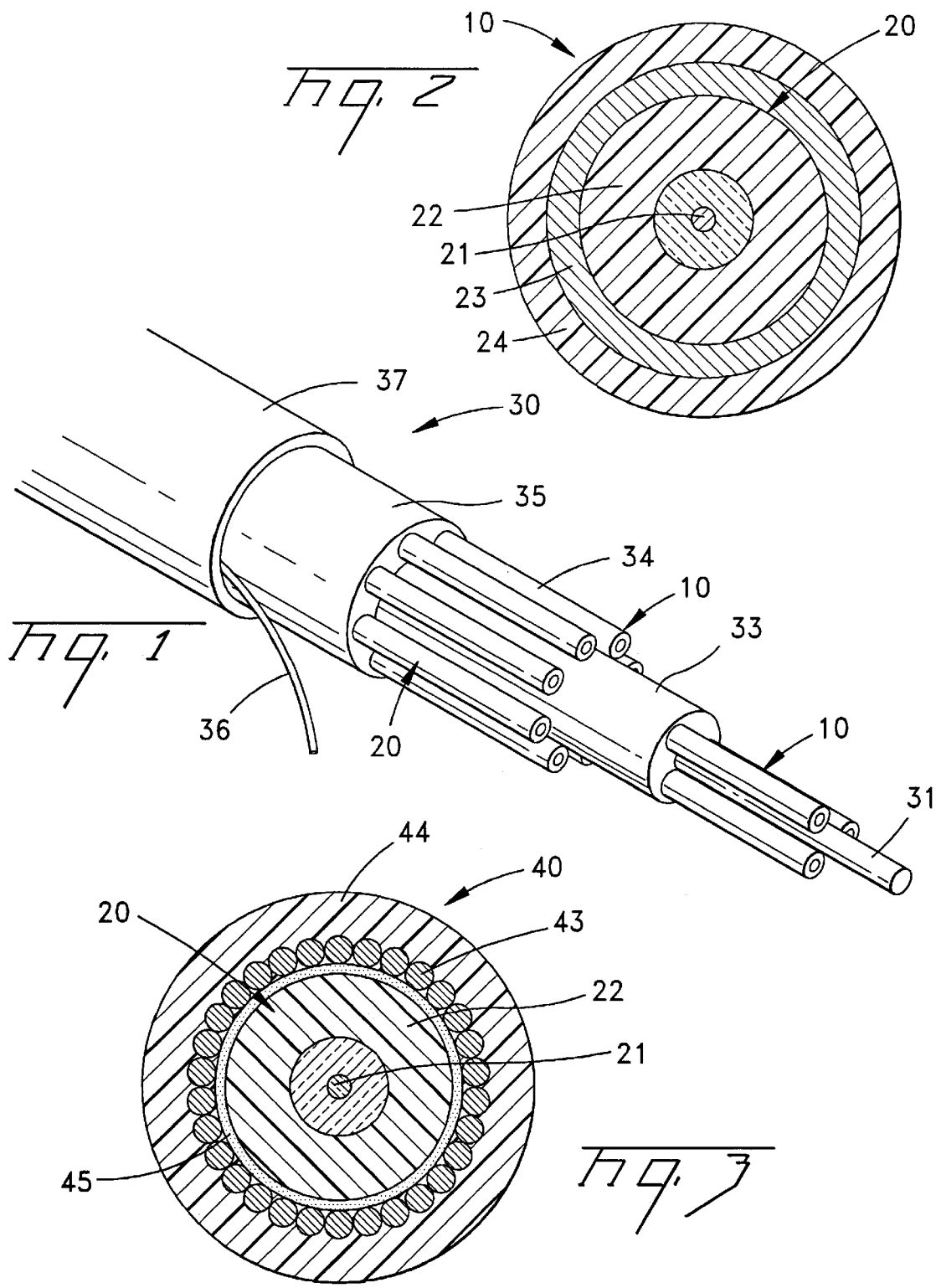

MICRO COMPOSITE FIBER OPTIC/ELECTRICAL CABLES

FIELD OF INVENTION

The present invention relates to composite cables that include at least one optical transmission component and at least one electrical transmission component.

BACKGROUND OF THE INVENTION

Fiber optic cables include at least one optical fiber that can transmit data, voice, and video information. Composite cable designs combine the high bit-rate capacity of at least one optical fiber with the electrical transmission of at least one electrical conductor. Conventional composite cable designs, however, can have unacceptable optical/electrical performance characteristics, can require undesirable structural features that make optical fiber access difficult, can be difficult to route through cable passageways, and/or can make the cable expensive to produce.

Conventional composite cables can include large and expensive electrical conductors. For example, U.S. Pat. No. 4,867,527, incorporated by reference herein, discloses a combined electrical power and optical fiber cable. The cable requires a large electrical conductor with insulation therearound, a sheath around the insulation, a one or two-part protective layer around the insulation, a tube within the protective layer, and at least one optical fiber loosely received in the tube. The protective layer can have armoring therearound and, in this case, the radial thickness of the protective layer is from two to four times the diameter of the tube.

A relatively large and expensive conventional composite cable has been designed for undersea applications. U.S. Pat. No. 5,468,913, incorporated by reference herein, discloses an electro-optical marine tow cable requiring a relatively large bundle of coaxial core conductors positioned at the neutral axis of the cable with the coaxial shield conductor circumscribing a dielectric material. The dielectric material includes fiber optic transmitters helically circumscribing the core conductors. Surrounding the electro-optical assembly is a watertight jacket and a protective armor cover for carrying the tensile forces imparted to the cable during marine towing operations.

A composite cable can include cable components that make optical fiber access difficult. For example, U.S. Pat. No. 5,202,944, requires an outer sheath made of stainless steel sheet having a thickness of 0.20 mm. The stainless steel sheet is formed into a tube shape and welded lengthwise to form the outer sheath. Coaxial cables can make fiber access difficult as they require multiple layers of electrical conductors, for example, as disclosed in U.S. Pat. No. 4,896,939 and U.S. Pat. No. 5,467,420.

SUMMARY OF THE INVENTION(S)

One aspect of the present invention relates a compact composite cable that is operative to transmit in electrical and optical transmission modes. The composite cable includes an optical fiber operative to transmit light comprising a silica-based core with a silica-based cladding having a lower index of refraction than the core. The core and cladding are surrounded by at least one layer of plastic that defines a coating surrounding and in contact with the cladding, and has an outside diameter of about 250 $\mu$m to about 500 $\mu$m. An electrical conductor surrounds the coating, and the composite cable includes an outermost cable jacket layer having an outside diameter of about 3,500 $\mu$m or less.

BRIEF DESCRIPTION OF THE DRAWING FIGURES

FIG. 1 is an isometric view of a fiber optic break-out cable according to the present invention.

FIG. 2 is a cross sectional view of one composite cable of the cable of FIG. 1.

FIG. 3 is a cross sectional view of a composite cable according to the present invention.

DETAILED DESCRIPTION OF THE INVENTION

Composite cables according to the present invention are compact and combine the high-bit rate capacity of at least one optical fiber with the transmission capability of at least one electrical conductor. With reference to FIGS. 1 and 3, exemplary composite optical cables 10,40 will be described. Optical cables 10,40 include at least one respective optical fiber 20. In a preferred embodiment, optical fiber 20 is operative to transmit light and includes a silica-based core 21 with a silica-based cladding having a lower index of refraction than the core. The core and cladding are surrounded by at least one, but preferably at least two layers of plastic 22, preferably urethane acrylates, that define a soft primary coating surrounding and in contact with the cladding, and a relatively rigid secondary coating that surrounds and is in contact with the primary coating. Core 21 can be, for example, a single mode or multi-mode optical fiber made commercially available by Corning Incorporated. In the preferred embodiment, an optical fiber 20 comprises an outside diameter of about 250–300 $\mu$m. The outside diameter can range up to about 500 $\mu$m or more as well. Optical fiber 20 can include a multi-core glass or plastic optical fiber as well.

Coating 22 is surrounded and in contact with preferably a single electrical conductor 23 (FIG. 2) or electrical conductor layer 43 (FIG. 3). In this sense, the electrical characteristic of cables according to the present invention is not coaxial. For good electrical performance, conductors 23,43 are preferably formed of a conductive metallic foil, a mesh, wires, vapor deposition film, and/or braid. Exemplary wire sizes range from 26 to 36 AWG. Alternatively, conductors 23,43 can be a laminated component as disclosed in U.S. Pat. No. 5,521,331, incorporated by reference herein, comprising a first shielding ember formed of an elongated ribbon of insulating material and a pair of elongated metal foil strips bonded to the opposite sides of the ribbon forming two concentric substantially closed shielded layers. Electrical conductors 23,43 will preferably exhibit suitable electrical and mechanical characteristics, e.g., cable bending stiffness and crush resistance.

Electrical conductors 23,43 are surrounded by respective cable jackets 24,44 preferably formed of a polyethylene material that forms the outermost layer of the cable. In an aspect of the present invention, the outside diameter of cable jacket 24,44 is about 3,500 $\mu$m or less, is preferably about 300 $\mu$m to about 2,500 $\mu$m, and is most preferably about 300 $\mu$m to about 1,000 $\mu$m.

Cable jackets 24,44 can be formed of any suitable plastic resin, for example, an inherently flame retardant material, e.g., PVC, that can include any suitable flame-retardant additives, e.g., metal hydroxides. The plastic resin can include any suitable inert fillers, and it may be foamed, for example, by conventional chemical or mechanical means. Cable jackets 24,44 can include at least one indicia, for example, an indentation, a contrasting sprayed ink line, and/or co-extruded stripes.

Composite cables according to the present inventions can comprise part of an exemplary break-out cable 30 (FIG. 1). Fiber optic cable 30 can include a dielectric central member 31, a first set of composite cables 10 and/or 40, and a layer of dielectric strength members 33. In addition, break-out cable 30 may include a second set of fiber optic cables 10 and/or 40 in a layer 34, a layer of dielectric strength members 35, a ripcord 36, and a cable jacket 37. Strength members 33,35 are preferably helically stranded or longitudinally disposed.

Composite cables according to the present invention are operative to transmit, for example, data, computer, and telecommunication information in optical and/or electrical transmission modes. In the preferred embodiment, the electrical conductor is used for power transmission. For compactness, optical fiber 20 is disposed within the electrical transmission components 23,43, and are operative to provide a high bit-rate capacity for optical transmission requirements. Electrical transmission components 23,43 can be used for data or power transmission. Cables made according to the present invention can also be used for toning, i.e., location of buried or duct cables.

For stress relief and or strippability, secondary coating 22 can include an outer layer defining a controlled adhesion zone 45 (FIG. 3). Controlled adhesion zone 45 can include, for example: a viscous slip layer, e.g., a gel, oil, or grease; a non-viscous or substantially non-viscous slip layer, e.g., a TEFLON coating; a protective buffer tube; and/or at least one strength member, e.g., fiberglass or aramid fibers. On the other hand, for a generally tight coupling of the electrical component to coating 22, zone 45 can include a relatively low modulus plastic or epoxy resin.

Manufacture

Manufacture of cables according to the present invention can be accomplished by feeding at least one optical fiber and at least one electrical conductor into an extruder and extruding a cable jacket therearound. Electrical conductors 23,43 can then be wrapped about the matrix and at least one respective jacket 24,44 applied thereover. Where strandable, the electrical conductor can be SZ, helically, or longitudinally applied over coating 22.

Operation

An illustrative transmission component access procedure includes peeling or stripping the cable jacket and electrical conductor away from the optical fiber. The optical fiber can then be connectorized to optical equipment or hardware, and the electrical conductor can be terminated with electrical connectors or equipment. Where the fiber optic cable 10,40 includes a controlled adhesion zone 45, then during cable bending some relative movement may be experienced between the electrical conductor and optical fiber.

The present invention has been described with reference to the foregoing exemplary embodiments, which embodiments are intended to be illustrative of the present inventive concepts rather than limiting. Persons of ordinary skill in the art will appreciate that variations and modifications of the foregoing embodiments may be made without departing from the scope of the appended claims. The composite cables described herein can be incorporated into many cable designs, for example, self-supporting, buried, indoor, and indoor/outdoor cable applications. Flame retardant jacket materials can be selected to achieve plenum, riser, or LSZH flame ratings. Super absorbent polymers or blocking substances, e.g., thixotropic greases, may be included in any interstice of the composite cable.

Accordingly, what is claimed is:

1. A composite cable that can transmit in electrical and optical transmission modes, said composite cable comprising:

an optical fiber operative to transmit light comprising a silica-based core with a silica-based cladding having a lower index of refraction than the core, the core and cladding are surrounded by two layers of plastic that define a first soft primary coating surrounding and in contact with the cladding, and a relatively rigid secondary coating that surrounds and is in contact with the primary coating, said optical fiber comprising an outside diameter of about 250 $\mu$m to about 500 $\mu$m;

an electrical conductor surrounding said secondary coating; and an outermost cable jacket layer having an outside diameter of about 3,500 $\mu$m or less.

2. The composite cable of claim 1, said electrical conductor comprising a single electrical conductor whereby said composite cable is not coaxial.

3. The composite cable of claim 1, said outermost cable jacket layer having an outside diameter of about 300 $\mu$m to about 2,500 $\mu$m.

4. The composite cable of claim 1, said outermost cable jacket layer having an outside diameter of about 300 $\mu$m to about 1,000 $\mu$m.

5. The composite cable of claim 1, said secondary coating comprises an outer layer defining a controlled adhesion zone.

6. The composite cable of claim 5, said controlled adhesion zone comprising a viscous slip layer selected from the group consisting of a gel, oil, and grease.

7. The composite cable of claim 5, said controlled adhesion zone comprising a substantially non-viscous slip layer selected from the group consisting of a TEFLON coating, a protective buffer tube, and a strength member.

8. The composite cable of claim 5, said controlled adhesion zone defining a generally tight coupling of said electrical component to said secondary coating with a relatively low modulus plastic or epoxy resin.

9. A composite cable that is operative to transmit in electrical and optical transmission modes, comprising:

an optical fiber operative to transmit light comprising a silica-based core with a silica-based cladding having a lower index of refraction than the core, said core and cladding are surrounded by at least one layer of plastic that defines a coating surrounding and in contact with the cladding, and has an outside diameter of about 250 $\mu$m to about 500 $\mu$m or more;

an electrical conductor surrounding the coating; and the composite cable includes an outermost cable jacket layer having an outside diameter of about 3,500 $\mu$m or less.

10. The composite cable of claim 9, said electrical conductor comprising a single electrical conductor whereby said composite cable is not coaxial.

11. The composite cable of claim 9, said outermost cable jacket layer having an outside diameter of about 300 $\mu$m to about 2,500 $\mu$m.

12. The composite cable of claim 9, said outermost cable jacket layer having an outside diameter of about 300 $\mu$m to about 1,000 $\mu$m.

\* \* \* \* \*